US00RE38275E

(19) United States
(12) Reissued Patent
Ruppert

(10) Patent Number: US RE38,275 E
(45) Date of Reissued Patent: Oct. 14, 2003

(54) METHOD AND APPARATUS FOR ELIMINATION OF COLOR FROM MULTI-COLOR IMAGE DOCUMENTS

(75) Inventor: Werner Ruppert, Schoenaich (DE)

(73) Assignee: International Business Machines Corp., Armonk, NY (US)

(21) Appl. No.: 09/283,749

(22) Filed: Apr. 2, 1999

Related U.S. Patent Documents

Reissue of:
(64) Patent No.: 5,621,816
Issued: Apr. 15, 1997
Appl. No.: 08/393,302
Filed: Feb. 22, 1995

U.S. Applications:
(63) Continuation of application No. 08/135,820, filed on Oct. 13, 1993, now abandoned.

(30) Foreign Application Priority Data

Oct. 19, 1992 (EP) ..... 92117810

(51) Int. Cl.[7] ..... G06K 9/00
(52) U.S. Cl. ..... 382/163; 382/167
(58) Field of Search ..... 382/162, 163, 382/164, 165, 166, 167, 168, 169, 171, 172, 170, 173, 209, 217, 222, 237, 232, 270, 271, 272, 273, 274, 275, 284, 307, 308, 309, 321

(56) References Cited

U.S. PATENT DOCUMENTS

| | | | | | |
|---|---|---|---|---|---|
| 3,938,088 | A | * | 2/1976 | Clark | 382/17 |
| 4,547,896 | A | * | 10/1985 | Ohtombe et al. | 382/17 |
| 4,547,897 | A | * | 10/1985 | Peterson | 382/17 |
| 5,041,993 | A | * | 8/1991 | Rawlings | 382/41 |
| 5,070,531 | A | * | 12/1991 | Schuerman et al. | 382/41 |
| 5,220,620 | A | * | 6/1993 | Nakano et al. | 382/17 |
| 5,241,609 | A | * | 8/1993 | Hasebe et al. | 382/61 |
| 5,283,698 | A | * | 2/1994 | Fukuzawa et al. | 382/65 |
| 5,285,271 | A | * | 2/1994 | Gennetten | 382/17 |

* cited by examiner

*Primary Examiner*—Bijan Tadayon
*Assistant Examiner*—Seyed H. Azaria
(74) *Attorney, Agent, or Firm*—Laurence R. Letson

(57) ABSTRACT

A method and apparatus for the elimination of color from a multi-color image document is described. All color information for every picture element of the image of the document is provided concurrently and for every picture element PEL the image signal of all provided colors are analyzed and for every picture element that image signal of that color is selected which has the minimum contrast relative to the background of the image document.

13 Claims, 7 Drawing Sheets

METHOD AND APPARATUS FOR ELIMINATION OF COLOR FROM MULTI-COLOR IMAGE DOCUMENTS

Matter enclosed in heavy brackets [ ] appears in the original patent but forms no part of this reissue specification; matter printed in italics indicates the additions made by reissue.

This application is a continuation of U.S. patent application Ser. No. 08/135,820, filed Oct. 13, 1993, now abandoned.

This invention pertains to a method and an apparatus for the elimination of color from multi-color image documents.

For character recognition purposes it is very advisable if not vital, to eliminate or to drop-out all image information which is redundant, such as for example the pre-printed form. Only the filled-in information is to be used for the optical recognition process. To facilitate the forms drop-out, the banking industry uses colored forms printed in colors such as red, green, yellow, and blue.

Usually optical readers of multi-font recognition capability in the banking and retail industries are equipped with optical drop-out color filters. These filters are placed in the optical path on a mechanical filter bank. It is known in the art to shift this filter bank by mechanical means such that the right filter is placed in the optical path, i.e. red, green, or blue color filter, for example, is placed in the optical path. The operator of such optical reading equipment has first to analyze the actual document in order to assess which drop-out color is to be used. Then the applicable color filter has to be manually adjusted using a slider in the optical path. So, for a red pre-printed form, a red color filter will be used. Due to the rules of physics the contrast of the pre-printed areas will strongly be reduced, or will be dropped-out but the filled-in information which is not printed and written in the same color, in this example red, remains untouched on the document. In most cases the contrast of the filled-in information is increased related to the background color. This afore-mentioned described procedure has to be performed for each color depending on the color of the pre-printed form.

It is known that the same effect is achieved with color lamps and color cameras if only one color is used at a time.

The above described simple methods fail totally if multi-color background is used, as for example especially in euro-cheques. If there for example a red drop-out color is used, then the red lines are dropped-out but not the green and the blue lines. In case of a blue filter, the blue lines are dropped-out but not the red and the green ones. In case of a green filter, the green lines are dropped-out but not the red and the blue ones. Thus, the background is not totally dropped-out.

There are other types of forms drop-out methods such as forms subtraction and spatial filtering methods. In forms subtraction the image of the empty pre-printed form is in a way subtracted from the filled-in form of the same type. In this method a mask matching method is used. This method has certain sensitivity regarding form shrinkage or expansion, form rotation, tolerances in the printing, and it shows a strong dependency on resolution. As a result usually there are still some parts of the background remaining on the document.

In forms drop-outs by spatial filtering methods there are used spatial frequency filters, logical filters and density filters, as described in many books and articles about digital image processing. These filters can reduce but not really drop-out the background without destroying the filled-in information to a certain extent, so-called erosion of the information, or with parts of the background left, so-called artifacts.

As a conclusion it can be said that traditional color drop-out methods as described before for mono color pre-printed forms are most efficient but fail for multi-color documents.

Therefore the objects of the present invention are to provide a method and an apparatus which efficiently remove or eliminate multi-color images contained on documents without using the handling of mechanical filter adjustment or the like.

This object as well as other objects are solved advantageously basically by applying the features described herein. Further advantageous embodiments are also described.

In accordance with the present invention color picture information is used, then for every single picture element all the image signals of all colors, normally the three colors red, green, and blue are analyzed, and finally by a special electronic or logical set-up automatically only the image signal of that color which has the minimum contrast relative to the document background are selected. For the analyzing purpose the color information is concurrently provided for every picture element of the image.

By this inventive basic solution an automatic picture element related color drop-out or elimination from the background is provided. This is performed without using any mechanical adjustments of filters as in the prior art.

In accordance with an advantageous further development of the present invention the color image signals are weighted and combined to a secondary output to provide a grey scale signal for archiving purposes of the image document.

Further advantages and details will be apparent from the following more detailed description of the invention given in conjunction with the embodiments shown in the drawing.

Figure 1:
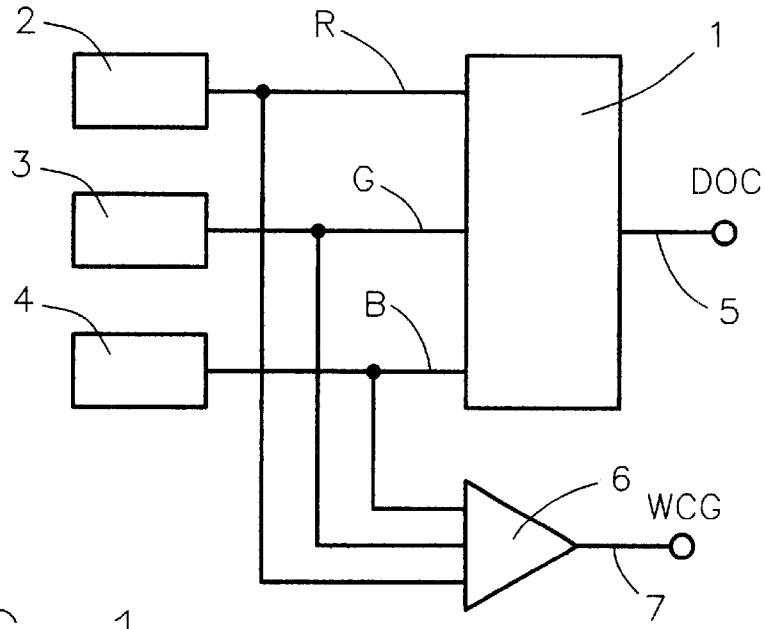
FIG. 1 is a schematic block diagram of the invention.

FIG. 1 shows in a schematic block diagram the principle of the invention. A maximum finder 1 has three inputs R, G, and B. These inputs are on the other hand outputs of a red data source 2, a green data source 3, and a blue data source 4. Input data from these color data sources 2, 3, and 4 are input simultaneously for each single picture element PEL to the maximum finder 1. In accordance with the present invention the maximum finder 1 selects out of these picture element related data the signal which has the minimum contrast to the background of the image document or in other words, which has the maximum signal value in the sense that it is the brightest signal. This color signal is output on output line 5 as the signal DOC as drop-lout color data for that specific picture element.

In accordance to a preferred further embodiment of the present invention the color data on lines R, G, and B from the color data sources 2, 3, and 4 are input to an adder 6. On output line 7 of adder 6 a signal WCG indicates the weighted color grey data output from adder 6 after having added the weighted colors. This is performed to have a grey value of each picture element for archiving purposes to thus be able to archive the image document.

The method underlining the schematic block diagram of FIG. 1 provides that for every picture element of an image several color data values are available. Those color data values are normally the values for the three primary colors, red, green and blue. For every single picture element PEL the image signals of all color data sources 2, 3 and 4 are analyzed. Finally for every picture element there is chosen simultaneously that color of that specific picture element, which has the maximum value. In other words, it also could be said it has the minimum contrast relative to the background of that picture element. By way of example, for a red background PEL this is the red data, for a green background PEL it is the green data and for a blue background PEL it is the blue data. The result of this analyzing and selection is the drop-out color data information DOC. This method thus works like an automatic drop-out color filter slider but with no mechanical means.

In the schematic diagram of FIG. 1 it is assumed that a bright, e.g. white PEL, has a higher data value than a dark PEL. This is the case for almost all modem image capturing devices. If this should not be the case the image data can be inverted before being processed with this method or the maximum finder has to replaced by a minimum finder. Another assumption is that the color data R, G and B are all normalized which means that for the white light of $BaSO_4$ all three color data are equal and correspond to 100% and also for a black cavity they are 0 and correspond to 0%.

The picture related output value DOC can be described in a more general way by the following equation:

$$DOC_{ij}=Max(R_{ij}, G_{ij}, B_{ij}) \quad (1)$$

The drop-out color value $DOC_{ij}$ for the i-th row and the j-th column is the maximum value for all available color values C. In the most general case this could be n colors and C would be $C_{k=1\ to\ n,\ i,\ j}$ for every picture element PEL. In this general case the general expression can be expressed by the following equation:

$$DOC_{ij}=Max(C_{1,i,j}, C_{2,i,j}, \ldots C_{n,j,j}) \quad (2)$$

The drop-out color data DOC are used preferably for optical character recognition purposes. The output data WCG on line 7 provide the weighted color grey data. These data are a result of a weighted averaging process. It can be expressed generally by the following equation:

$$a_B \times B_{ij} a_g + G_{ij} + a_R \times R_{ij} = WCG_{ij} \quad (3)$$

The coefficients $a_B$, $a_G$ and $a_R$ indicate the different weights for the different color data R, G, and B. If they are equal to 1 then WCG is the normal average of the normalized color values. In the most general case for n colors the following equation can be used:

$$a_1 \times C_{1,ij} a_2 \times C_{2,ij} + \ldots + a_n C_{n,ij} = WCG_{ij} \quad (4)$$

A practical application is this, if e.g. all coefficients are set to 0 except one, than the signal WCG on line 7 of the arrangement as shown in FIG. 1 will act like a normal single color scanner. If for example only $a_R$ in equation (3) is set to 1 and the coefficients $a_G$ and $a_B$ are set to 0, then only the red color data are used and the WCG data are like the data of a scanner with a conventional red color drop-out filter. The WCG data are used for archiving purposes, that means that the scanned image data are stored for later retrieval and control purposes.

Figure 2:
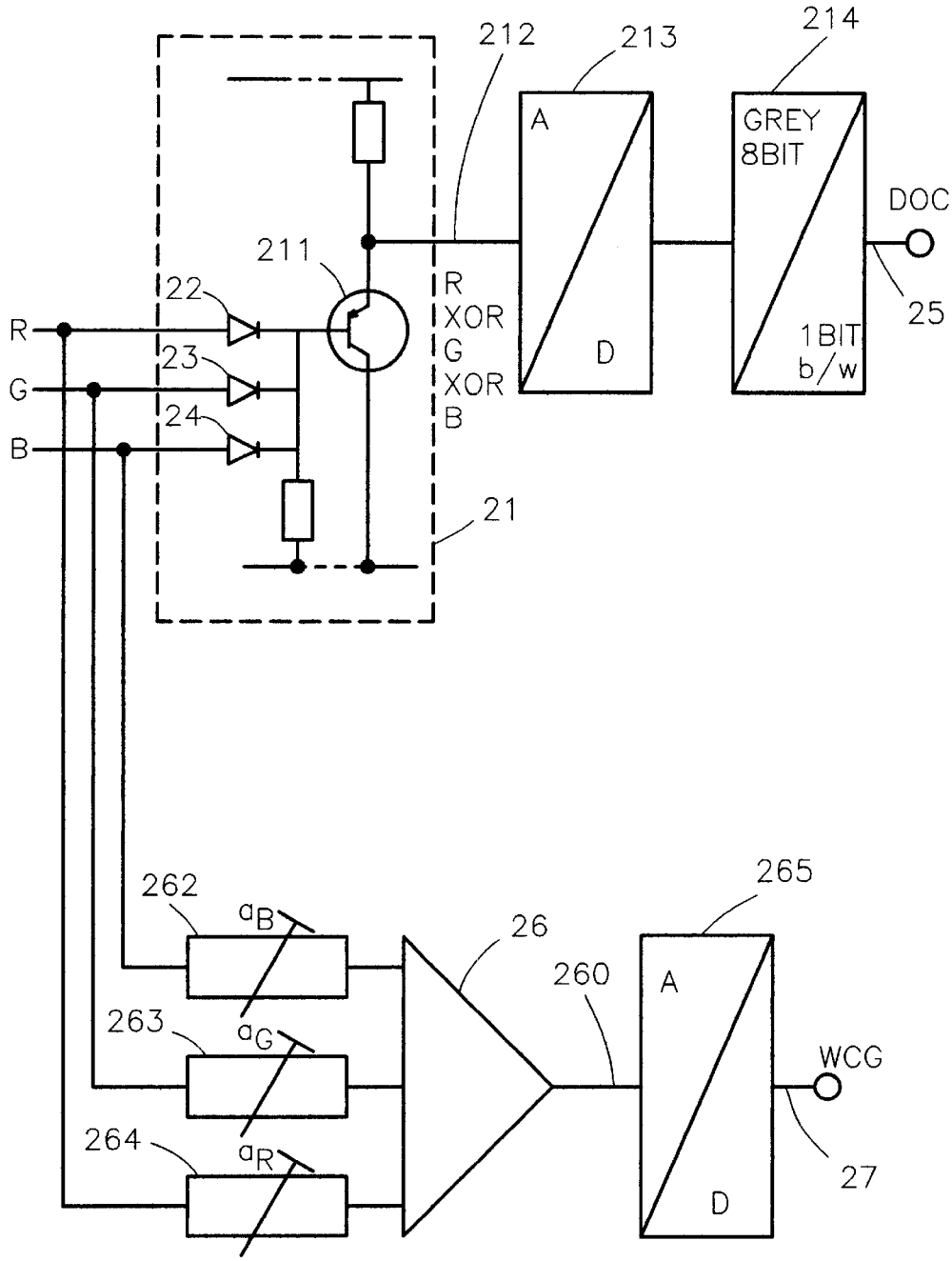
FIG. 2 is a schematic block diagram of a specific implementation of the present invention.

In FIG. 2 there is shown schematically an analog version of the arrangement in accordance with the present invention. The maximum finder 21 consists of a transistor 211 to which, over diodes 22, 23 and 24, the color data R, G, and B are input. Thus, at the output 212 of transistor 211 and the maximum finder 21 the color values are X-ored as indicated by R xor G xor B. By an analog to digital converter 213 the analog value on line 212 is converted for example to an 8-bit grey value which is input to a dynamic clipping level module 214 which forms out of said 8-bit grey value a 1-bit black or white signal. The clipping of the grey values is performed by a dynamic threshold level. If the current grey value is greater than this threshold level the output bit is set to 1 (or 0) else to 0 (or 1). Dynamic means that this threshold level is set dynamically in relationship to the image, specially the background surrounding the current PEL. This signal is the signal DOC on line 25.

Similar to FIG. 1, in FIG. 2 it is shown that the color values R, G, and B are input to an adder 26. The color values are input over variable resistors 262, 263, and 264 in order to change the weighting coefficients $a_B$, $a_G$, and $a_R$. The analog output 260 of adder 26 is input to an analog to digital converter 265 which edits for example an 8-bit signal on line 27 representing the signal WCG as weighted color grey data.

Figure 3:
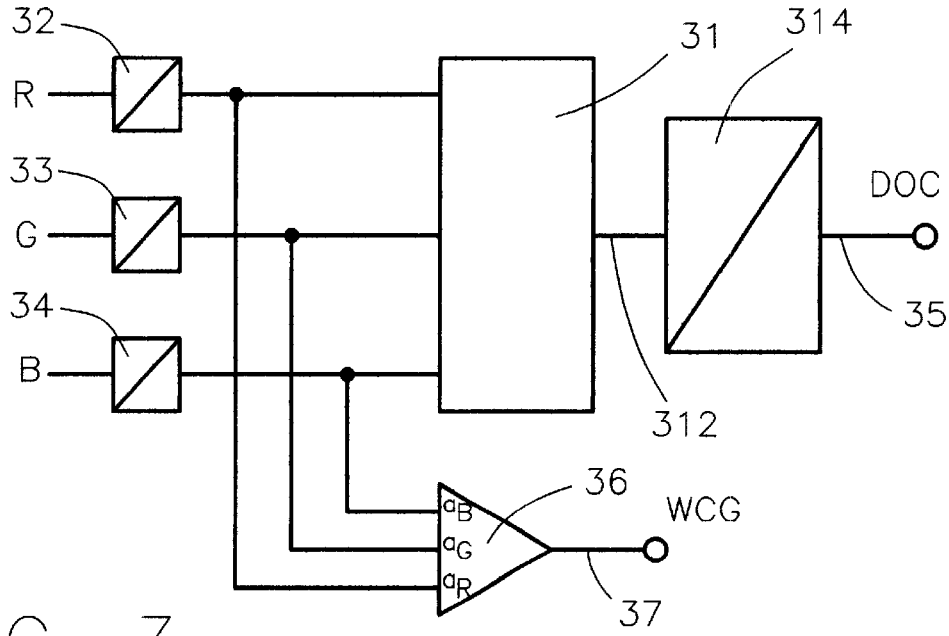
FIG. 3 is a schematic block diagram of a further implementation of the present invention.

In FIG. 3 a digital version is shown of the arrangement in accordance with the present invention. Maximum finder 31 and adder 36 are digital modules. The color values R, G, and B are input over analog to digital converters 32, 33, and 34 to the respective inputs of maximum finder 31 and adder 36 with the possibility to weight the input by $a_R$, $a_g$ and $a_B$. Output 312 of maximum finder 31 is input to a dynamic clipping level module 314 which provides a 1-bit black or white signal DOC on output line 35 from a digital grey signal which may consist of an 8-bit grey value. The output of adder 36 is the weighted color grey data on line 37.

Figure 4:
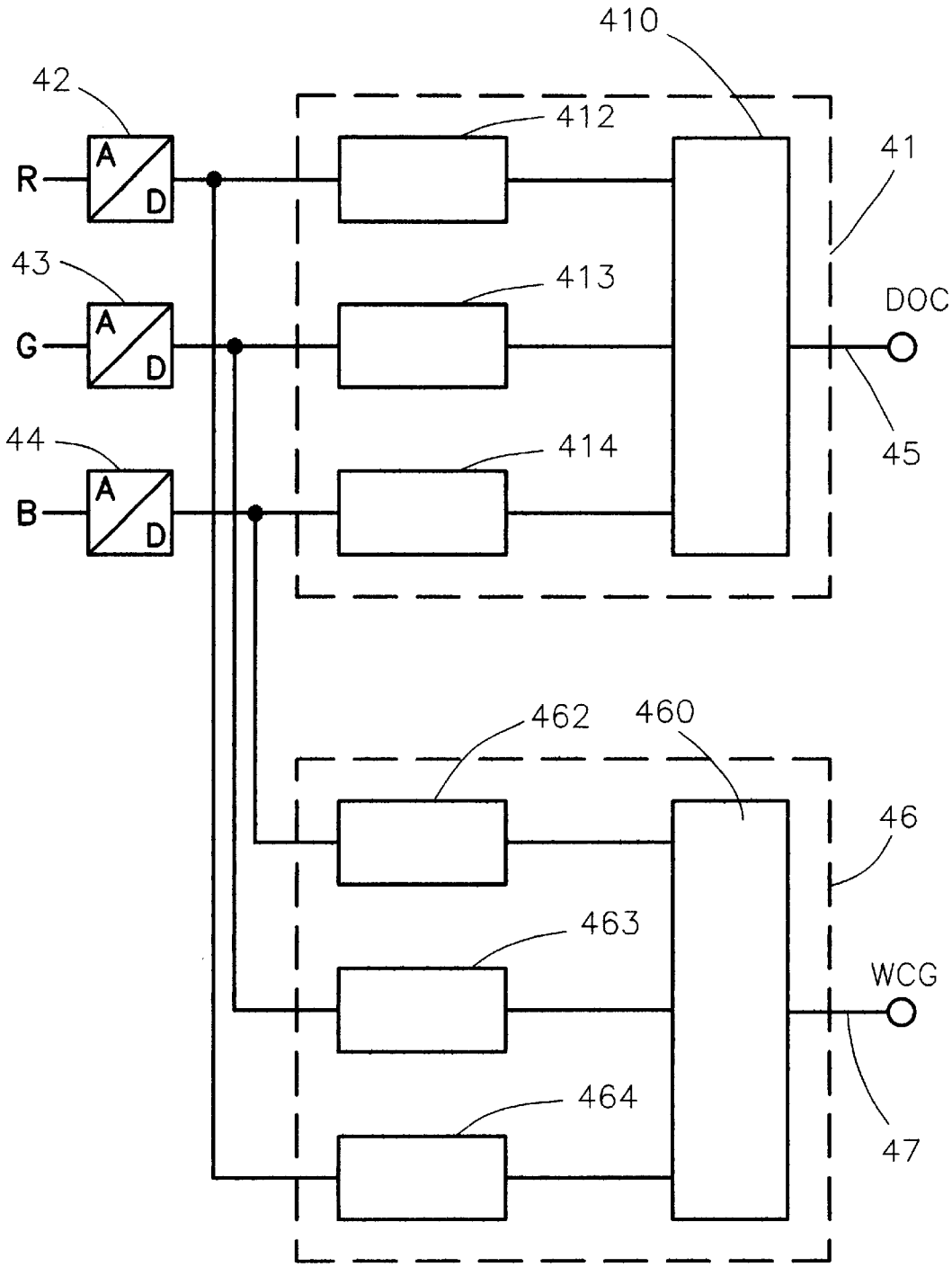
FIG. 4 is a schematic block diagram of a still further implementation of the present invention based on transputers.

In FIG. 4 a still further implementation of the arrangement in accordance with the present invention is shown schematically. The maximum finding function is performed by a transputer 410 and three transputer link adapters 412, 413, and 414. These three transputer link adapters 412, 413, 414 are connected by three transputer links to transputer 410 and the forth transputer link forms output 45 on which the drop-out color value DOC is output. The color values R, G, and B are input over analog digital converters 42, 43, and 44. Adder 46 for providing on output line 47 the weighted color grey data WCG, is also built up by transputer technology. Transputer 460 is connected over three transputer links with transputer link adapters 462, 463, and 464. The forth transputer links forms the already mentioned output 47. The color values R, G, and B are thus input in digital form, in parallel as well as synchronously to the six transputer link adapters 412, 413, 414 and 462, 463, 464.

It is the task of transputer 410 within maximum finder 41 to find in accordance with equation (1) and (2) above, the maximum of the three applied color values for each single picture element and it also runs a dynamic thresholding algorithm to provide the signal as a 1-bit black or white data on output line 45. Transputer 460 may run in parallel to speed-up the overall complete process. This transputer 460 weights, as already described, the color data according to the equation (3) and (4) above, and thus provides the WCG data. The programs to run the different tasks are loaded into the transputers. It might be possible in a stripped-down version to run both tasks on only one transputer. It then has to run the task of maximum finding, dynamic thresholding, and weighting and combining the colors to one grey value.

Figure 5:
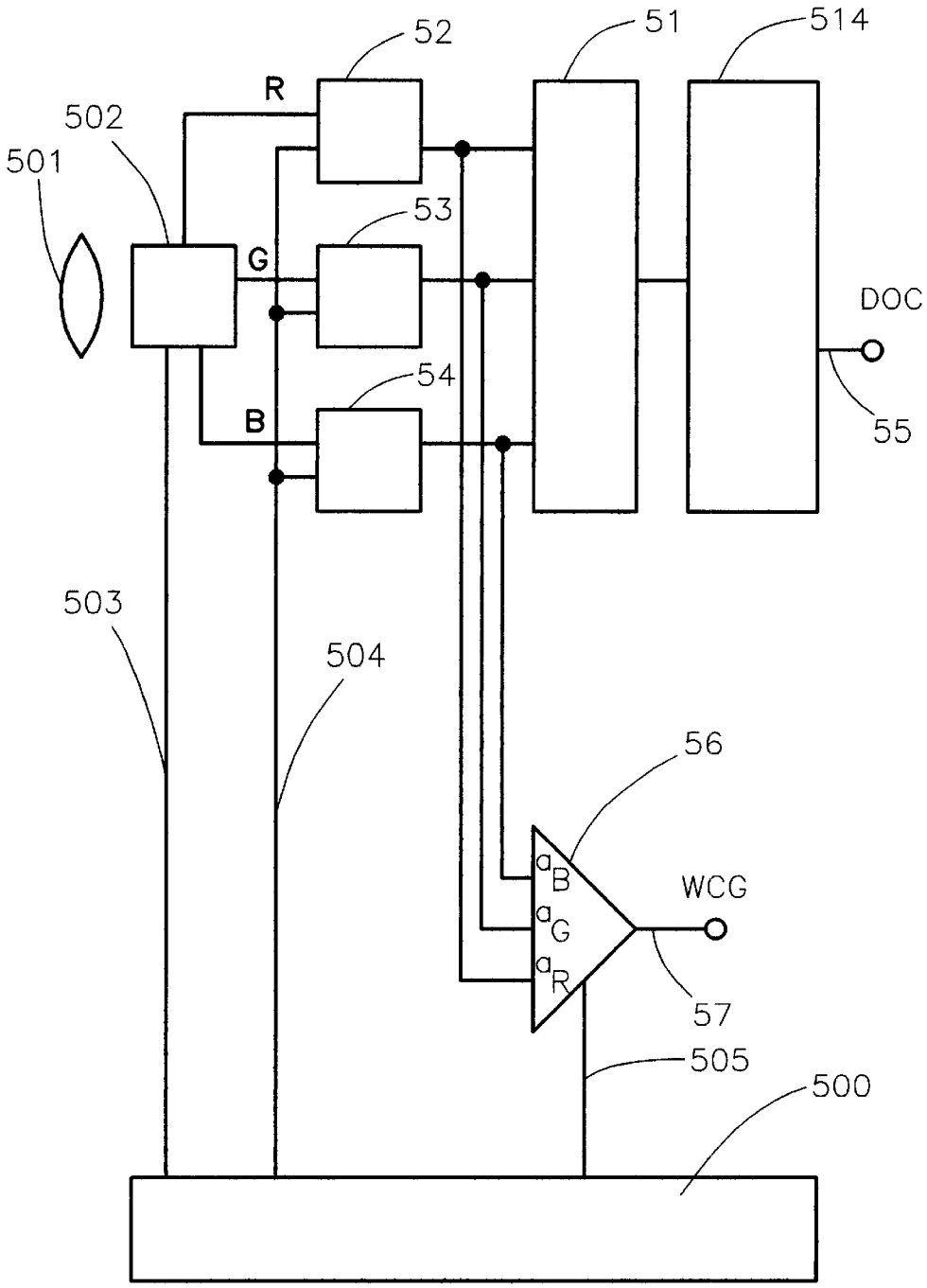
FIG. 5 is a schematic block diagram of a progressive electronic implementation of the invention.

In FIG. 5 there is shown a progressive electronic implementation of the arrangement in accordance with the present invention. The progressive implementation assumes that the complete image data for all colors is available either in electronic frame buffers or in the work station computer in RAM or on disks. The example shown in FIG. 5 contains frame buffers 52 for the red color R, 53 for the green color G, and 54 for the blue color B. These color data are provided to the frame buffers by a three color charged coupled device (CCD) camera 502. Lens 501 indicates this camera action. The color data values are input from the frame buffers 52, 53, and 54 to maximum finder 51 and adder 56. Output of maximum finder 51 is input to a dynamic digital thresholding device 514 which performs a dynamic clipping and outputs on line 55 the drop-out color value DOC. Adder 56 outputs on line 57 the weighted color grey data WCG. As depicted in FIG. 5 there is provided a timing pulse generator 500 which over line 503 provides synchronization pulses to the three color CCD camera 502. Furthermore, it provides synchronization pulses over a line 504 to the three frame buffers 52, 53, and 54, and over line 505 synchronization pulses are provided to the adder 56.

After the frame buffers for all colors are stored the described three functions of maximum finding, dynamic thresholding, and weighting of colors can be performed synchronized to each other.

Figure 6:
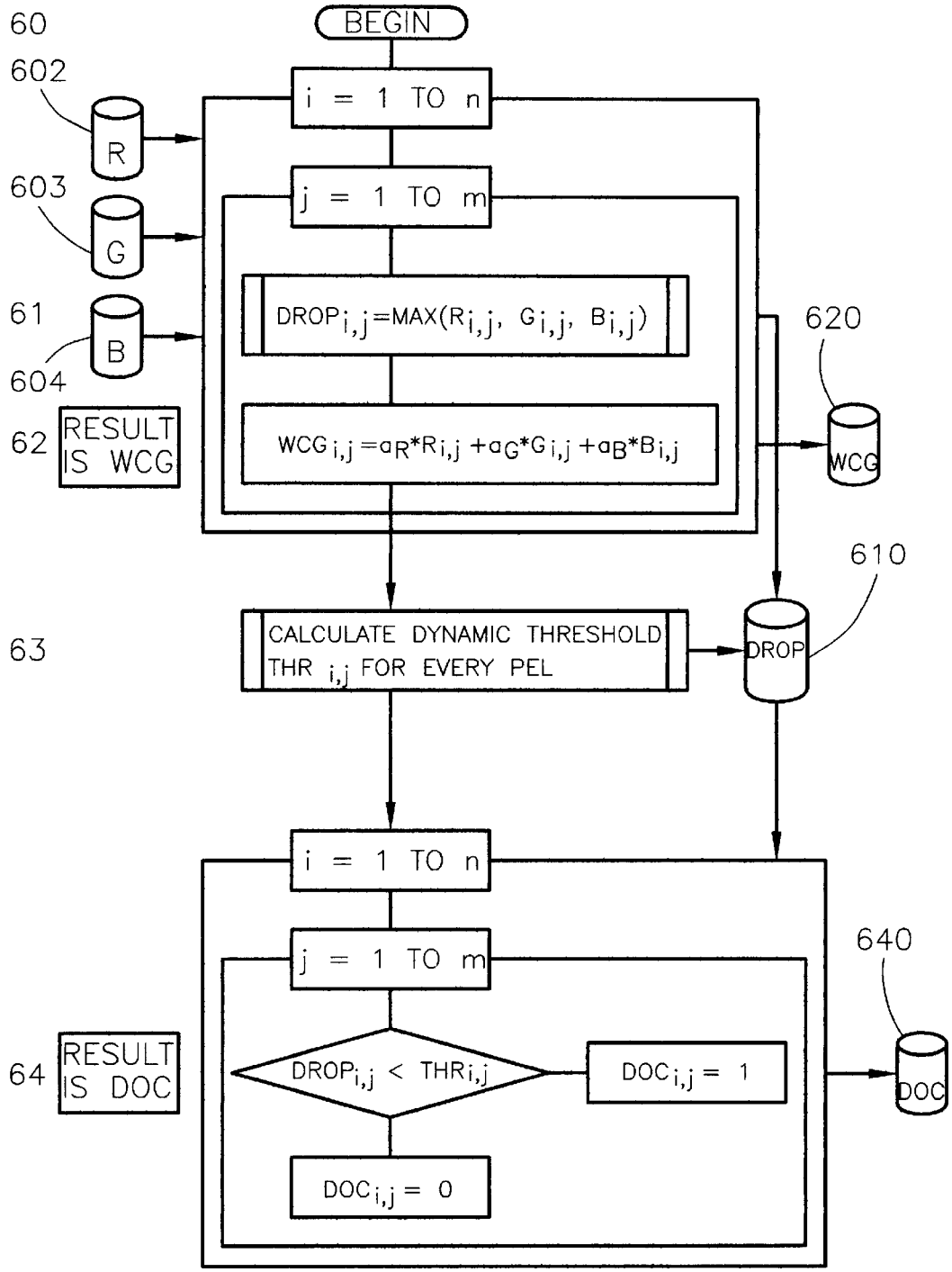
FIG. 6 is a flow diagram of a software implementation of the invention.

In FIG. 6 a schematic flow diagram for a software implementation of the method in accordance with the present invention is shown. It is a prerequisite that there are three image data sets which are captured simultaneously from the same color image for the red, green, and blue color are provided for all n rows i=1 to n as well as for the m lines j=1 to m. This is indicated by the three data sources 602, 603, 604. After the start in step 60, in step 61 the maximum value for each color and each picture element is found out in accordance with the equation:

$$DROP_{ij}=MAX(R_{ij}, G_{ij}B_{ij}).$$

The result is indicated by data set DROP and reference numeral 610. This data set is used in further steps.

Furthermore, in step 62 the weighted color grey data for each picture element and every color is calculated in accordance with the equation:

$$WCG_{ij}=a_R\times R_{ij}+a_G\times G_{ij}+a_B\times_{ij}.$$

This result is indicated by data set WCG and reference numeral 620.

This means that by this the weighted color grey value WCG for archiving purposes of every picture element and thus the overall total image is determined. Next in step 63 using as input data set DROP 610, there is calculated the dynamic threshold $THR_{ij}$ for every picture element PEL. In step 64 it is decided if the value $DROP_{ij}<THR_{ij}$ resulting in the drop-out color data for every picture element if i runs from 1 to n and j runs from 1 to m. The resulting data set DOC is indicated by reference numeral 640.

It is necessary for the working of the present invention to have concurrently all color information for every picture element of the image. This can be achieved by several methods, be it simultaneously or by a time multiples method.

Figure 7:
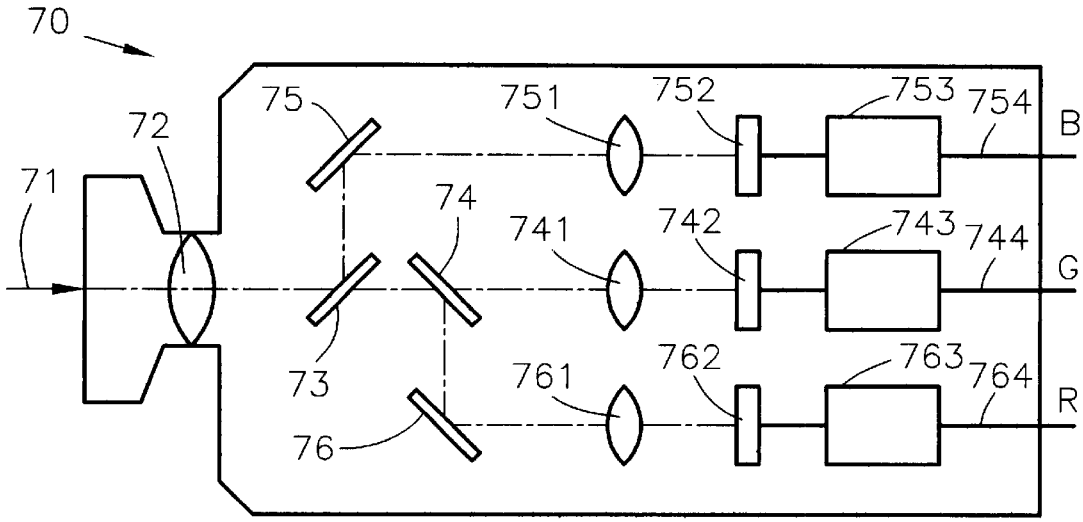
FIG. 7 is a schematic diagram of a sensor color camera used for providing color information.

An example for the simultaneous method is given by a color camera that provides the primary color components, normally red R, green G, and blue B for each picture element PEL simultaneously. An example of the principle working arrangement of such a camera is shown in FIG. 7. Basically camera 70 contains a focusing lens system 72 which focuses the incoming image, indicated by arrow 71, onto a first semi-transparent mirror 73. The reflected part is then again reflected at mirror 75 to form, for example, the blue string. That part of image 71 which is not reflected from semi-transparent mirror 73 is partly reflected at a second semi-transparent mirror 74 onto mirror 76 to form for example the red string. The part which passes semi-transparent mirror 74 forms for example the green string. All three images raised from the blue string, the green string, and the red string for example are focused by objective lens systems 751, 741, and 761, onto a blue filter 752 or a green filter 742 or a red filter 762 respectively. Those filtered images are sensed by matrix sensors which might be in charged coupled device technology or television technology. Sensor 753 is to issue, for example on output line 754, the blue signal B, or sensor 743 which images the green signal G on output line 744 or sensor 763 which outputs the red signal R on output line 764. Thus, at the output the three basic colors B, G, and R are present and can be used for further application. The signals are then for example input to maximum finder 1 in FIG. 1 from the different color sources 2, 3, and 4.

Figure 8:
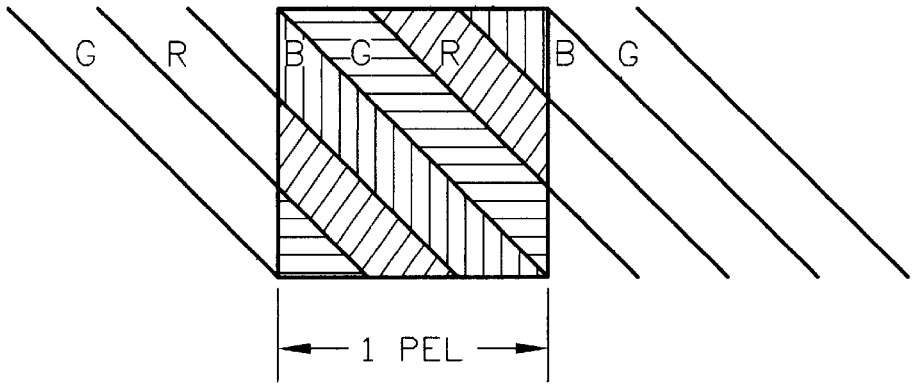
FIG. 8 is a schematic diagram of an inclined three color CCD linear image sensor used for providing color information.

Another example for the simultaneously gaining color information for every single picture element PEL is shown in FIG. 8. FIG. 8 represents schematically an inclined three color CCD linear image sensor. The color sensing elements are inclined by an inclination angle of about 45° and provide an approximated simultaneous RGB output as in one picture element PEL. An example for such an sensor is the TOSHIBA TCD 126C sensor (as shown in the TOSHIBA data book, 1989 for CCD linear image sensors on page 38).

Figure 9:
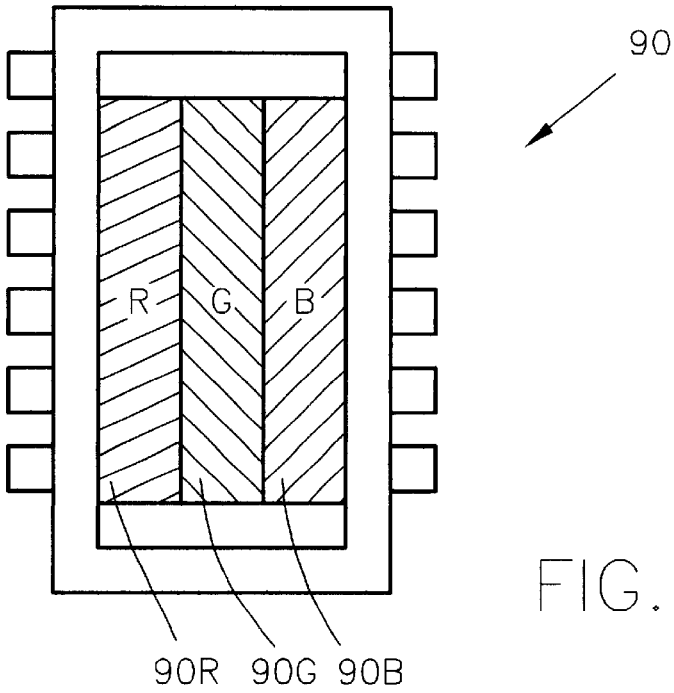
FIG. 9 is a schematic representation of a three lines CCD color image sensor used for providing picture related color information.

In the time multiplex method for providing the color information concurrently to the maximum finder 1, as for example in FIG. 1, a three line CCD color image sensor as shown in FIG. 9 may be used. This three line CCD color image sensor 90 consists of three parallel sensor lines 90R for the red color, 90G for the green color, and 90B for the blue color. An example might be the TOSHIBA TCD 140C (as shown in the TOSHIBA data book, 1989, on page 310). For the normal use of this linear array, the color scanning of an image in the three primary colors there is no problem with the physical distance between the scanning lines as the scanning process can easily be synchronized with analog line memories, for example staggered CCD lines (as shown in the TOSHIBA data book, 1989 on page 38).

Figure 10:
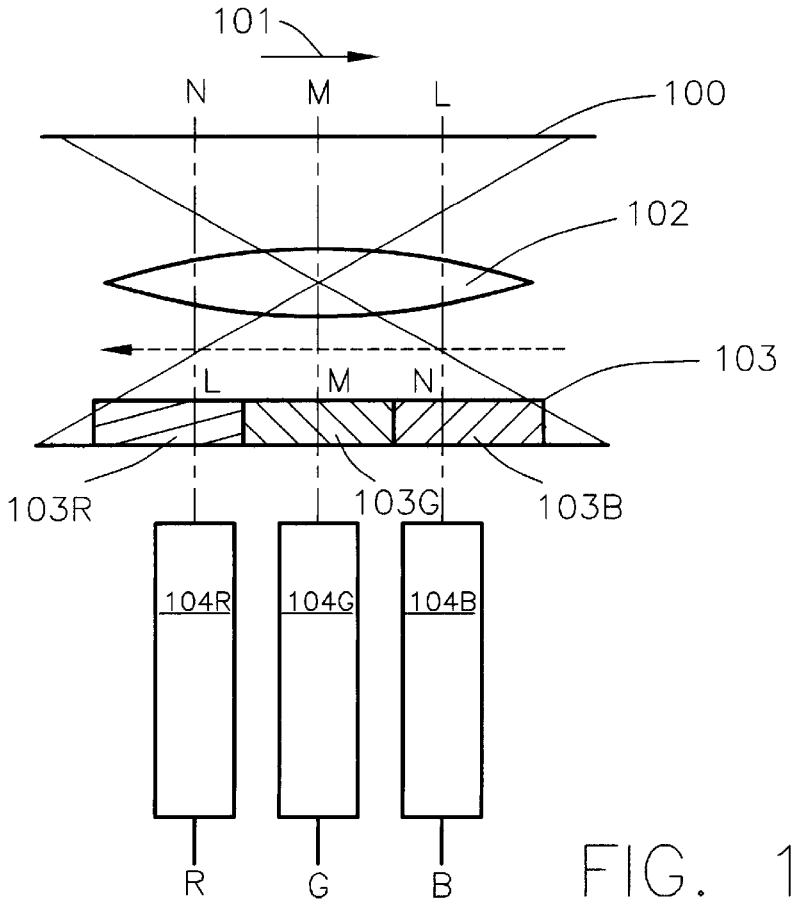
FIG. 10 is a schematic block diagram showing the use of delay lines for synchronization in a further mode for providing picture element related color information.

This operation, however, is only applicable when the forms feed pitch is synchronized with the scan period. For that purpose a schematic representation of the use of delay lines for synchronization is shown in FIG. 10. A paper to be scanned might be fed in a plane 100 in the direction of the arrow 101, having points N, M, and L to be scanned. By an optic element 102 having for example a reduction of 8:1, those points N, M, and L are focused on a three line CCD sensor 103 of which the sensor lines 103R, 103G, and 103B are shown in sectional view. The sensed output of sensor 103R is input to a delay line 104R which for example may delay the output R for none or one scan period. The sensed color value from sensor 103G is put in a delay line 104G delaying the input signal for one or two scan periods for example and outputting the green signal G. The color value scanned by sensor 103B is input to a delay line 104B delaying the signal for two or three scan periods and outputting the color value B. So for example the point L at its first position (N) would be scanned by the blue sensor 103B but the output will be delayed with delay line 104B for three scan periods or two scan periods at least, then point L at its second position (M) would be scanned with the green sensor 103G but the output G will be delayed by delay line 104G for one scan period at least and finally point L at its third position (L) would be scanned with the red sensor 103R and the output would be either used directly or one scan period later. Thus, during the third scan period all three color signals are available concurrently as required by the present invention. If one assumes in the example shown in FIG. 10 that the destined points L, M, and N on a sheet of paper have a distance of 85 $\mu$m which corresponds to about 300 PEL/inch and the optic system 102 has a reduction of 8:1, a scan period or line read out period of about 2700 photodiodes with a clock pulse fequency of 5 megahertz, then a paper feed speed in the direction of 101 of 157 millimeter/sec for a TOSHIBA TCD 2250C with 10.5 $\mu$m×10.5 $\mu$m center to center distance would allow a synchronized operation.

The method in accordance with the present invention and the different embodiments for realizing this method have been shown in the figures. Furthermore, there has been shown alternate embodiments for providing concurrently color information for every single picture element.

In advantageous manner the invention as described is able to remove color from multi-color image documents, especially multi-color cheques, to thus prepare the optical character recognition of those documents. Thus, it is easier to concentrate on all the filled-in information. Important aspects of the present invention are that concurrently all color information for every picture element is provided, that for every picture element the image signals of all provided colors are analyzed and that finally for every picture element that image signal is selected which has the minimum contrast to its background or in other words which has the maximum value in the sense of being the brightest signal.

I claim:

1. Apparatus for elimination of color from a multi-color image of a document having an image and a background comprising:

a) means for providing concurrently signals for all color information of each picture element of the image of said document;

b) means for determining a maximum signal value for all color information signals for analyzing said color information signal of all input colors of each picture element simultaneously and for outputting only said signal having the determined maximum value;

c) means for converting said signal having a maximum value to a value representative of either a black or white picture element with the color dropped out of said image;

d) means for assembling a data base of the values representing all picture elements of an image with the color dropped out of said image, for character recognition, and e) a weighting adder to which said color information signals are input, said adder combining and weighting said color information signals for providing a weighted color grey value for archiving said image.

2. The apparatus of claim 1, wherein said means for determining includes analog circuitry having diode logic.

3. The apparatus of claim 1, wherein said means for determining includes an analog/digital converter for each color information signal input and an integrated circuit means for maximum finding by X-oring said color information signal values.

4. The apparatus of claim 1, wherein said means for determining comprises a transputer and wherein said color information signal values are supplied to said transputer through analog to digital converters.

5. The apparatus of claim 1, further comprising a separate data storage means for storing data sets for each color.

6. A method of eliminating color from multi-color image documents having an image and a background, in processing of said document for optical character recognition, comprising the steps of:

a) providing concurrently all color information signals for each picture element of said image of said document, said providing performed simultaneously;

b) analyzing said color information signals of all colors for each picture element;

c) selecting a color information signal for each picture element which has the minimum contrast relative to said background of said document;

d) outputting only said selected color information signal for each picture element having said minimum contrast;

e) converting said selected color information signal to a value representative of the picture element with the color dropped out of the image;

f) assembling a data base of the values representing the picture elements with the color dropped out forming a data base representative of a black and white image, wherein said simultaneously providing is performed by projecting an image of a picture element onto an inclined one line CCD color image sensor providing an approximately simultaneous output of the primary color component signals, wherein said inclined sensor is inclined by approximately 45 degrees.

7. A method of eliminating color from multi-color image documents having an image and a background, in processing of said document for optical character recognition, comprising the steps of:

a) providing concurrently all color information signals for each picture element of said image of said document;

b) analyzing said color information signals of all colors for each picture element;

c) selecting a color information signal for each picture element which has the minimum contrast relative to said background of said document;

d) outputting only said selected color information signal for each picture element having said minimum contrast;

e) converting said selected color information signal to a value representative of the picture element with the color dropped out of the image;

f) assembling a data base of the values representing the picture elements with the color dropped out forming a data base representative of a black and white image, and g) weighting and combining said color image signals into one output, providing a weighted color grey signal for archiving purposes.

8. A method of eliminating color from multi-color image documents having an image and a background, in processing of said document for optical character recognition, comprising the steps of:

a) providing concurrently all color information signals for each picture element of said image of said document, said providing concurrently all color information performed in a time multiplexed manner;

b) analyzing said color information signals of all colors for each picture element;

c) selecting a color information signal for each picture element which has the minimum contrast relative to said background of said document;

d) outputting only said selected color information signal for each picture element having said minimum contrast;

e) converting said selected color information signal to a value representative of the picture element with the color dropped out of the image;

f) assembling a data base of the values representing the picture elements with the color dropped out forming a data base representative of a black and white image;

said time-multiplex manner comprising scanning each picture element of an image for each primary color component and delaying results of each primary color component scan until all color scan results of each pel are available; and g) weighting and combining said color image signals into one output, providing a weighted color grey signal for archiving purposes.

*9. Apparatus for elimination of representations of color from a scanned data collection electronically representing a multi-color document, said document having an image and a background comprising:*

*a) means for providing concurrently signals for all color information of each picture element of the image of said document;*

*b) means for determining a maximum signal value for all color information signals for analyzing said color information signals of all input colors of each picture element simultaneously and for outputting only said color information signal having said determined maximum value;*

*c) means for converting said signal having said maximum value to a digital value representative of either a black or white picture element with the color dropped out of the image, and*

*d) means for assembling a data base of said digital values representing all picture elements of said document image with the color dropped out of the image, for character recognition,*

*thereby converting said scanned data collection to a data base of digital values representing said document image in a black and white form with all color representation eliminated.*

*10. The apparatus of claim 9, wherein said means for determining includes analog circuitry having diode logic.*

*11. The apparatus of claim 9, wherein said means for determining includes an analog/digital converter for each color information signal input and an integrated circuit means for maximum finding by x-oring said color information signal values.*

*12. The apparatus of claim 9, wherein said means for determining comprises a transputer and wherein said color information signal values are supplied to said transputer through analog to digital converters.*

*13. The apparatus of claim 9, comprising a separate data storage means for storing data sets for each color.*

* * * * *